Dec. 22, 1942.  G. SEIDEL  2,306,227

SINE BAR

Filed July 24, 1942

WITNESSES

INVENTOR
George Seidel
BY
Munn, Liddy & Glaccum
ATTORNEYS

Patented Dec. 22, 1942

2,306,227

UNITED STATES PATENT OFFICE 2,306,227

SINE BAR

George Seidel, New York, N. Y.

Application July 24, 1942, Serial No. 452,129

5 Claims. (Cl. 33—174)

This invention relates to a sine bar.

The principal object of the invention is the provision of a device which is designed and adapted for accurately ascertaining the sines of compound as well as single angles in order to measure and lay out work of various kinds in degrees and minutes.

A further object is the provision of a sine bar designed and adapted to simultaneously set up a compound angle for the aforesaid purposes.

Another object of the invention is the provision of a device of the indicated character which is simple of construction, without operating parts, eliminates friction and wear, has no calibrations or graduations, and one which may be handled expeditiously in finding or testing the angles of various kinds of work.

The nature of the invention and its distinguishing features and advantages will appear when the following specification is read in conjunction with the accompanying drawing, in which—

Figure 1:
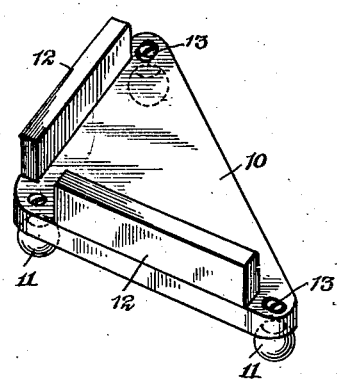
Fig. 1 is a perspective view of a sine bar embodying the features of the invention.
Figure 2:
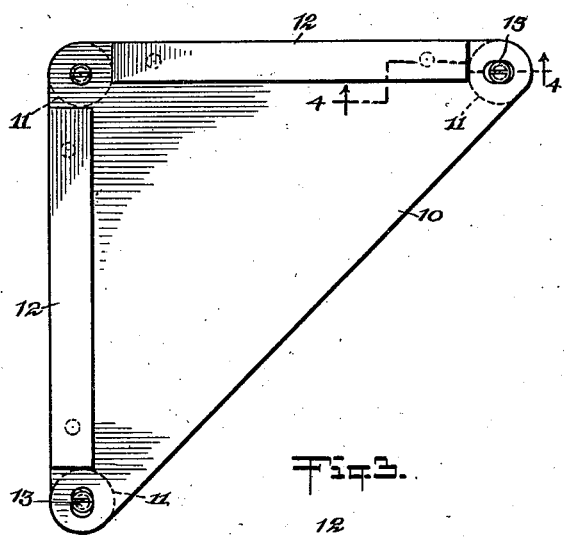
Fig. 2 is a plan view.
Figure 3:
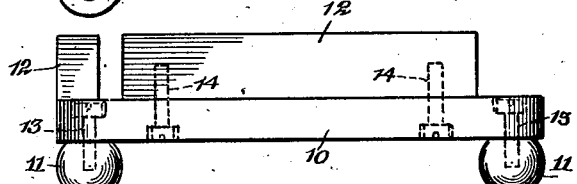
Fig. 3 is a side view.

Referring now more particularly to the several views of the drawing, it will be apparent that the device includes a base 10 having feet 11 on the underside thereof and blocks 12 on its upperside.

The base 10 may be of any suitable shape and dimensions, and in the present instance is triangular and of uniform thickness throughout so that the upper and lower surfaces are parallel. The shape of the base 10 is in the form of a right triangle.

The feet 11 are similar and each is greater than a hemisphere and less than a sphere. The feet are arranged in planes at a right angle with respect to each other and are disposed at the three points respectively of the base. The points are rounded to conform to the feet. Each of the feet is held in place preferably by a machine screw 13 which extends downwardly through the base into the foot. The holes in the base for two of the screws 13 are somewhat larger than the screws in order to obtain the proper adjustment or setting of the feet at a certain distance in order that feet in one plane constitute a pair having a known "constant" and the feet in the other plane constitute a pair also having a known "constant." In the present instance the "constant" of each pair of feet is the same and five inches have been selected, although any other "constant" may be used and that of one pair of feet may be different from the other pair. The feet 11, when resting on a horizontal surface, cause the upper flat surface of the base to lie horizontally or parallel to said horizontal surface.

Figure 5:
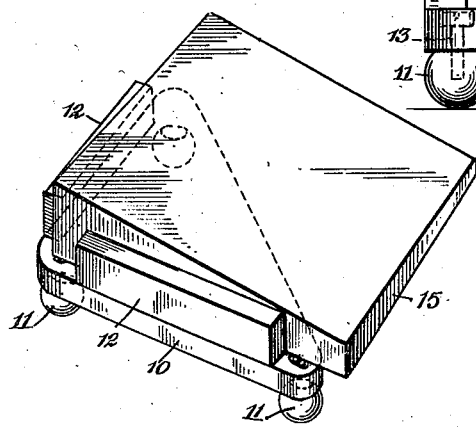
Fig. 5 is a perspective view showing a piece of work supported on the sine bar.
Figure 4:
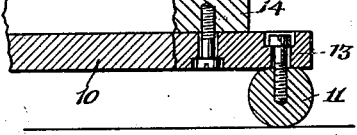
Fig. 4 is a detail sectional view taken on the line 4—4 of Fig. 2.

The blocks 12 constitute abutments paralleling the sides respectively of the base which define the right angle and are therefore disposed at a right angle with respect to each other. The blocks 12 are contacted by the work in order to prevent the same from sliding off the top of the base when the work is being set up, preparatory to finding or testing the angles in order to measure and lay out in degrees and minutes, jigs, fixtures, templates, tools and other kinds of work. Each block 12 is held in place by screws 14 which extend upwardly through the base into the b In Fig. 5 a piece of work is supported on the sine bar in contact with the blocks 12 and the upper surface of the base 10. The upper surface of the work 15 has a compound angle which it is desired to ascertain, for instance. A compound angle consists of two angles between two planes measured from two directions at right angles to each other.

Figure 6:
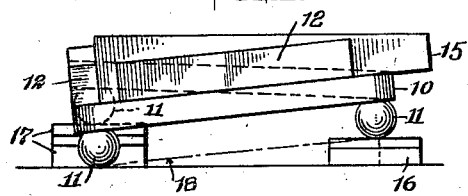
Fig. 6 is a view of the sine bar and work set up for ascertaining a compound angle, and looking at the same to show how one of the angles is ascertained.
Figure 7:
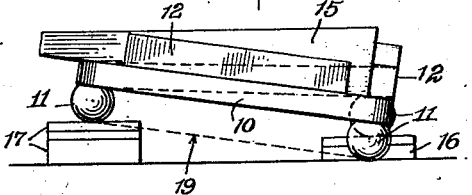
Fig. 7 is a view similar to Fig. 6 but looking toward another side to show how the second angle is ascertained.

In Figs. 6 and 7 the sine bar and work are set up by the use of gage blocks 16 and 17, respectively, under two of the feet 11, with the third or center foot, together with the blocks 16 and 17 resting on a suitable horizontal surface for ascertaining the compound angle of the work. In Fig. 6 the parts are viewed in order to find one angle, designated 18. The total height of the blocks 16 is divided by the "constant" of the pair of feet 11 at one side of the work as an index which may be used in connection with a sine table to find the sine of angle 18, and from it to determine the exact angle. In Fig. 7 the parts are viewed from a second side to ascertain the other angle which is designated 19. The total height of the blocks 17 is divided by the "constant" five inches between the centers of the feet 11 at the second side of the work to get the index of the sine table to find the sine of angle 19 to enable angles to be located or set in order to lay out the work of various kinds in degrees and minutes. In other words the compound angle of work may be ascertained for the purposes and in the manner stated hereinabove.

The sine bar of the present invention may be used to find a single angle as well as a compound angle. To find a single angle of a piece of work, the center foot 11 rests on a horizontal surface with a gage block or blocks arranged under one other foot 11 with the block or blocks resting on said surface.

I claim:

1. A sine bar for ascertaining a single or compound angle comprising a base having an upper flat surface, and three rounded feet on the base at the underside thereof, said feet being arranged in planes at a right angle with respect to each other to provide two known "constants," said feet when resting on a horizontal surface causing said upper flat surface of the base to lie horizontally.

2. A sine bar as defined in claim 1 wherein the base is triangular and the feet are disposed at the three points respectively of the base.

3. A sine bar as defined in claim 1 wherein the feet are similar and each is greater than a hemisphere and less than a sphere.

4. A sine bar as defined in claim 1 wherein the distance between the centers of each pair of feet represents a "constant."

5. A sine bar as defined in claim 1 wherein the distance between the centers of each pair of feet represents a "constant," and the "constant" of one pair of feet being similar to that of the other pair.

GEORGE SEIDEL.